US008920948B2

(12) United States Patent
Folks et al.

(10) Patent No.: US 8,920,948 B2
(45) Date of Patent: Dec. 30, 2014

(54) SUBSTRATE PATTERNING IN PERPENDICULAR STORAGE MEDIA

(75) Inventors: Liesl Folks, Campbell, CA (US);
Michael K. Grobis, San Jose, CA (US);
Dan S. Kercher, Santa Cruz, CA (US);
Ricardo Ruiz, Santa Clara, CA (US);
Kentaro Takano, San Jose, CA (US);
Bruce D. Terris, Sunnyvale, CA (US);
Qing Zhu, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 291 days.

(21) Appl. No.: 13/341,997

(22) Filed: Dec. 31, 2011

(65) Prior Publication Data
US 2013/0170065 A1 Jul. 4, 2013

(51) Int. Cl.
G11B 5/66 (2006.01)

(52) U.S. Cl.
USPC .............. 428/832; 428/827; 427/130

(58) Field of Classification Search
USPC ......... 428/832, 831.2, 836; 360/135; 427/130
See application file for complete search history.

(56) References Cited

U.S. PATENT DOCUMENTS

| | | |
|---|---|---|
| 6,440,520 B1 | 8/2002 | Baglin et al. |
| 6,709,775 B1 | 3/2004 | Takahashi et al. |
| 6,764,738 B1 | 7/2004 | Wu et al. |
| 7,041,394 B2 | 5/2006 | Weller et al. |
| 7,153,597 B2 | 12/2006 | Yang et al. |
| 7,518,834 B2 | 4/2009 | Shigematsu |
| 7,588,843 B2 | 9/2009 | Iida et al. |
| 7,776,388 B2 | 8/2010 | Dobisz et al. |
| 8,048,546 B2 | 11/2011 | Albrecht et al. |
| 8,619,383 B1 * | 12/2013 | Jung et al. .................. 360/75 |
| 2008/0084635 A1 | 4/2008 | Lee et al. |
| 2009/0196488 A1 | 8/2009 | Nealey et al. |
| 2009/0311363 A1 | 12/2009 | Dobisz et al. |

FOREIGN PATENT DOCUMENTS

JP 2008171489 A 7/2008

OTHER PUBLICATIONS

Cheng et al. "Nanostructure Engineering by Templated Self-Assembly of Block Copolymers" Oct. 3, 2004, vol. 3, Nature Publishing.
Y. Maekawa et al. "Orientation of Nano-Grains in Hard-Disk Media on Ion-Beam Textured Substrates" IEEE Transactions on Magnetics, vol. 43 No. 6, Jun. 2007.

* cited by examiner

Primary Examiner — Holly Rickman
(74) Attorney, Agent, or Firm — Kunzler Law Group, PC

(57) ABSTRACT

According to one embodiment, a patterned magnetic storage medium is disclosed herein. The magnetic storage medium includes a pattern formed on a substrate. The pattern includes at least a first and second feature and an edge defined between the first and second features. Additionally, the magnetic storage medium includes a magnetic layer formed on the pattern. The magnetic layer includes grains separated by a non-magnetic segregant boundary. The segregant boundary is positioned above the edge of the pattern.

9 Claims, 5 Drawing Sheets

SUBSTRATE PATTERNING IN PERPENDICULAR STORAGE MEDIA

TECHNICAL FIELD

This disclosure relates to magnetic storage media, and more specifically to physical features in patterned magnetic storage media.

BACKGROUND

Hard-disk drives have rotating high precision disks that are coated on both sides with a special thin film media designed to store information in the form of magnetic patterns. Electromagnetic read/write heads suspended or floating only fractions of micro inches above the disk are used to either record information onto the thin film media, or read information from it.

A read/write head may write information to the disk by creating an electromagnetic field to orient a cluster of magnetic grains in one direction or the other. Each grain will be a magnetic dipole pointing in a certain direction and also creating a magnetic field around the grain. All of the grains in a magnetic region typically point in the same direction so that the magnetic region as a whole has an associated magnetic field. The read/write head writes regions of positive and negative magnetic polarity, and the timing of the boundaries between regions of opposite polarity (referred to as "magnetic transitions") is used to encode the data. To increase the capacity of disk drives, manufacturers are continually striving to reduce the size of the grains.

The ability of individual magnetic grains to be magnetized in one direction or the other, however, poses problems where grains are extremely small. The superparamagnetic effect results when the product of a grain's volume (V) and its anisotropy energy ($K_u$) fall below a certain value such that the magnetization of that grain may flip spontaneously due to thermal excitations. Where this occurs, data stored on the disk is corrupted. Thus, while it is desirable to make smaller grains to support higher density recording with less noise, grain miniaturization is inherently limited by the superparamagnetic effect.

Perpendicular recording addresses this "thermal" limit. In conventional "longitudinal" magnetic recording, the magnetization in the bits is directed circumferentially along the track direction. In perpendicular recording, the magnetic bits point up or down perpendicular to the disk surface.

Granular magnetic films such as CoCrPt-MOx used in modern perpendicular magnetic data storage rely on one or more segregants for grain isolation. The segregant, denoted as M in the above formula, is a material with low surface energy and low affinity. During the sputtering process of the magnetic film, the low-surface-energy segregant comes out of the sputtering solution and moves toward the grain boundary to form a boundary area for each grain.

However, due to the nature of random nucleation, the locations of magnetic grains are also random. This leads to the formation of a zig-zag boundary between data bits, which may cause difficulties in forming tracks around the disk. Another issue is the distribution of grain size. To maximize data density, grain size needs to be uniform and as small as possible. However, with conventional processes, non-uniformity in grain size may occur, which can degrade recording performance. Finally, random nucleation also leads to random grain boundary thickness and random average grain boundary thickness distribution.

SUMMARY

The subject matter of the present application has been developed in response to the present state of the art, and in particular, in response to the problems and needs in the art that have not yet been fully solved by currently available patterned magnetic storage media and/or methods of forming patterned magnetic storage media.

According to one embodiment, a patterned magnetic storage medium is disclosed herein. The patterned magnetic storage medium includes, in one embodiment, a patterned substrate having a pitch, the pattern having physical boundaries, and a coating of magnetic and non-magnetic material disposed on the patterned substrate. The non-magnetic material may be a segregant that forms a boundary area around a perimeter of each of a plurality of magnetic grains.

According to yet another embodiment, a magnetic storage medium includes a pattern formed on a substrate. The pattern includes at least a first and second feature and an edge defined between the first and second features. Additionally, the magnetic storage medium includes a magnetic layer formed on the pattern. The magnetic layer includes grains separated by a non-magnetic segregant boundary. The segregant boundary is positioned above the edge of the pattern. In some implementations, the edge is configured to promote the growth of the segregant boundary above the edge and to promote the growth of magnetic regions adjacent the segregant boundary.

In certain embodiments, the pattern is formed with a pitch in the range of between the width of about 1 grain and 6 grains, in the range of between the width of about 2 grains and about 4 grains, or about 3 grains.

In one embodiment, the patterned substrate is formed of a topographical pattern having a plurality of protrusions. The protrusions may have a height in the range of between about 1 nm and about 10 nm or in the range of about 3 nm and about 4 nm.

In another embodiment, the patterned substrate comprises a chemical pattern formed of a first material and a second material. The chemically patterned substrate is substantially planar in some implementations.

According to one embodiment, a magnetic disk drive system is disclosed. The system includes a controller module, a suspension arm, a read/write head, and a magnetic storage disk. The magnetic storage disk includes a pattern formed on a substrate where the pattern includes a pattern of features. The magnetic storage disk also includes a magnetic layer formed on the pattern. The magnetic layer includes grains separated by non-magnetic segregant boundaries. The non-magnetic segregant boundaries are positioned above an edge of a respective one of the features. Each of the segregant boundaries form a boundary about a perimeter of a respective one of the grains.

According to one embodiment, a method for fabricating a patterned magnetic storage medium is disclosed herein. The method may include determining a pitch of a pattern to be formed on a substrate, the pattern having physical boundaries, patterning the substrate with the pitch, and depositing a coating of magnetic and non-magnetic material on the substrate.

According to another embodiment, a method for fabricating a patterned magnetic storage medium includes determining a pitch of a pattern to be formed on a substrate. The pattern includes first and second features with an intersection defined between respective first and second features. The method further includes patterning the substrate according to the pattern with the determined pitch. Additionally, the method includes depositing a coating of magnetic grains and non-magnetic material on the substrate. Depositing includes accumulating the non-magnetic material above each of the intersections of the first and second features to form segregant boundaries, and accumulating the magnetic grains between the segregant boundaries.

The method, in certain embodiments, also includes guiding the growth of the magnetic and non-magnetic material based on the physical boundaries of the pattern. The non-magnetic material is a segregant that forms a boundary area around a perimeter of each of the plurality of magnetic grains. The method may also include topographically patterning the substrate with a plurality of protrusions, or chemically patterning the substrate with a first material and a second material.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

Figure 1:
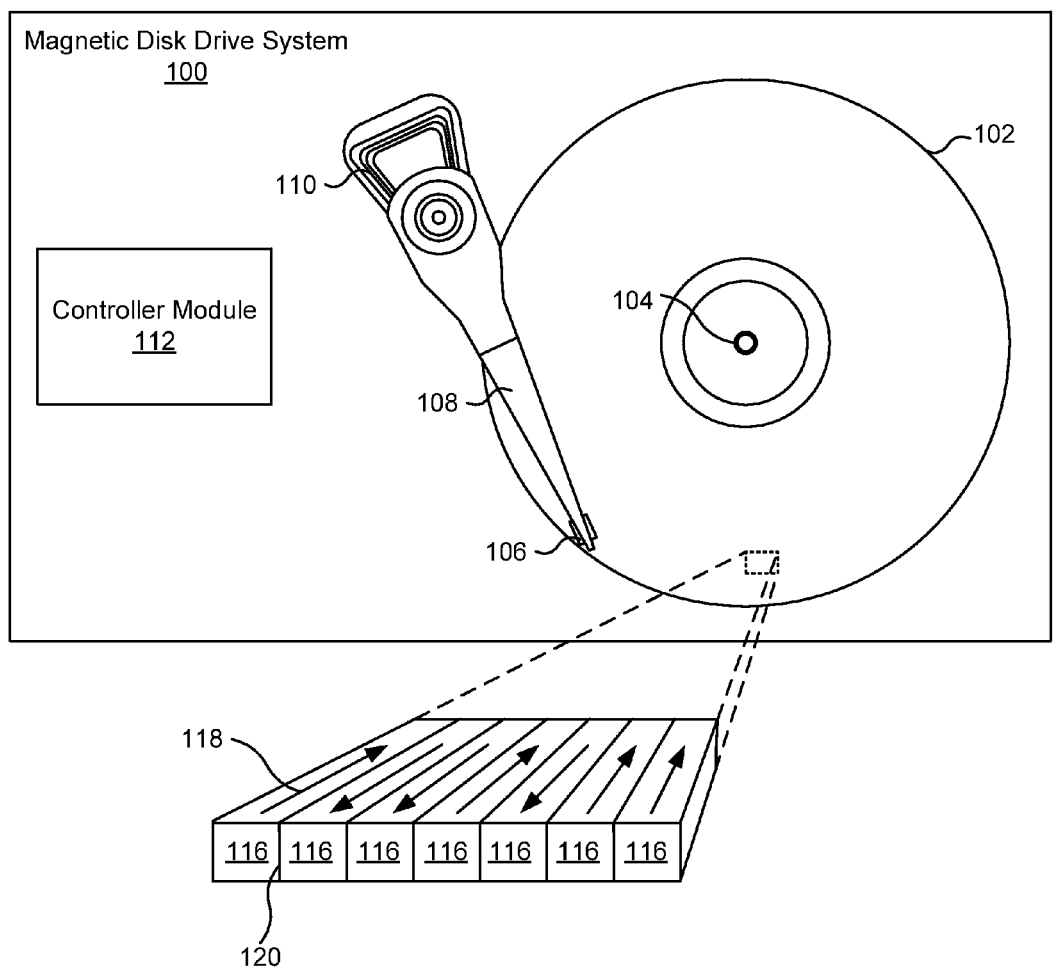
FIG. 1 is a schematic illustration of one embodiment of magnetic disk drive system.

FIG. 1 is a schematic diagram illustrating one embodiment of a magnetic disk drive system 100. In the depicted embodiment, the magnetic disk drive system 100 includes a magnetic storage disk or disks 102, a spindle 104, a read/write head 108, a suspension arm 108, an arm actuator 110, and a controller module 112.

The disk 102 can be defined as a magnetic storage medium that includes magnetic material for magnetically storing information. The spindle 104 allows the disk 102 to rotate about an axis defined by the spindle 104. The read/write head 106 is mounted on the suspension arm 108, which is connected to the arm actuator 110. The arm actuator 110 actuates the position of the suspension arm 108 and, in conjunction with the rotation of the disk 102 about the spindle 104, physically actuates the location of the read/write head 106 in relation to the surface of the disk 102. In a write mode, the read/write head 106 induces a magnetic field that changes the magnetic orientation of a portion of the disk 102. In a read mode, the read/write head 106 reads information from the disk 102 by measuring or sensing an orientation of the magnetic fields of different portions of the storage media. The controller module 112 controls the arm actuator 110, the read/write head 106, and the rotational speed and position of the disk 102 to perform reading, writing, and other operations.

In one embodiment, the disk 102 includes a rigid substrate and storage elements for magnetically recording and/or storing data. The storage elements may be near a surface of the disk 102 such that the information stored by the elements can be read or information can be written to the elements by the read/write head 106. In one embodiment, the storage elements include a plurality of magnetic regions 116 defined formed on the surface of the disk 102.

In the depicted embodiment, the magnetic regions 116 are formed so that the directions of the "magnetic bits" (depicted by the arrows 118) are directed into and out of the disk 102. Each magnetic region 116 may be defined by a boundary known as a grain boundary 120. Grain boundaries 120 separate adjacent magnetic regions 116 into independent magnetic areas, each capable of storing a single bit of data storage. For example, if the material (e.g., grains) of region 116 is magnetically oriented in a first general direction, the magnetic disk drive system 100 may read that bit as a zero '0'. In contrast, if the material of the region 116 is magnetically oriented in a second general direction generally opposite the first general direction, the magnetic disk drive system 100 may read the bit as '1'.

In one embodiment, the magnetic grains of each of the magnetic regions 116 are oriented in a direction perpendicular to the surface of the disk 102. Although the depicted embodiment illustrates an example of perpendicular recording technology, the embodiments described below may be implemented in traditional magnetic disks and/or bit patterned magnetic disks. In other words, the substrate patterning described below is applicable in all types of magnetic disks where a bit of data storage is stored in a magnetic region.

Figure 2:
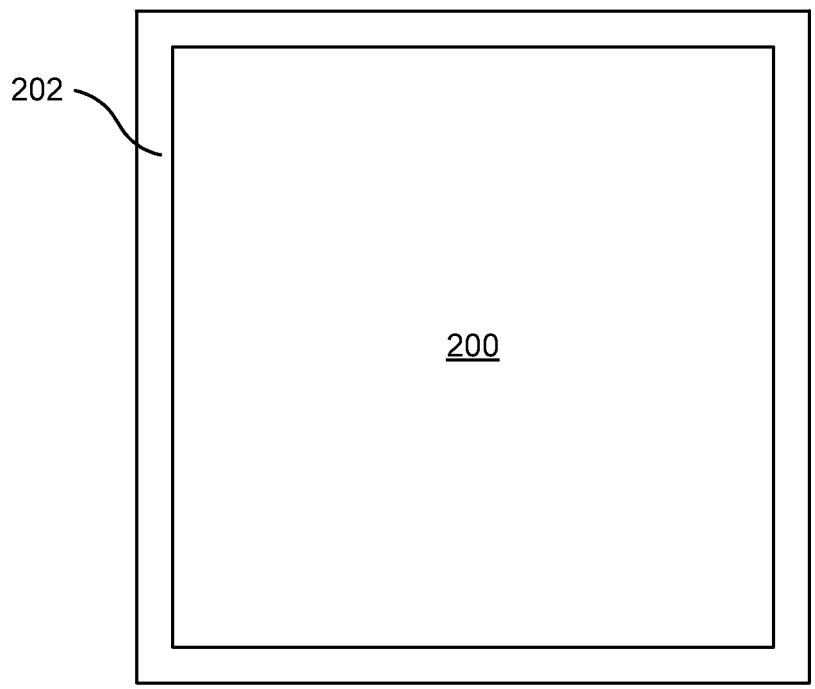
FIG. 2 is a schematic block diagram illustrating one embodiment of a magnetic region.

FIG. 2 is a schematic block diagram illustrating one embodiment of a grain 200. In one embodiment, multiple grains 200 may form a magnetic region as described above. Alternatively, a magnetic region 116 may be formed of a single grain 200. The grain 200 is depicted here as a square. However, grains 200 may be formed in different geometric shapes depending on many factors, as one of skill in the art will recognize. To magnetically isolate one grain 200 from an adjacent grain, a non-magnetic boundary 202 may be formed around the perimeter of the grain 200 so that little or no magnetic field may be written to or read from the boundary 202.

The grains 200 are generally formed by granular magnetic films such as CoCrPt. The boundary 202 may be formed of a non-magnetic material such as a metal oxide having the general formula of MOx. The metal M of the metal oxide functions as a segregant and can be a material with low surface energy and a low affinity. Examples of segregants M include, but are not limited to, Si, Ta, Ti, and B. When the magnetic film is deposited onto the disk 102, the incoming magnetic material and non-magnetic segregant are energetic and mobile. Material mobility drives low-surface energy segregants to come out of the magnetic material and collect together. As will be described below, substrate patterning guides the movement of the segregant to the perimeter of the grain to form the non-magnetic boundary 202 that magnetically isolates each grain 200 from an adjacent grain. In one embodiment, the width of the boundary 202 area is in the range of between about 0.5 nm and 8 nm. In another embodiment, the width of the boundary 202 area is in the range of between about 1 nm and 5 nm. In yet another embodiment, the width of the boundary 202 area is in the range of between about 2 nm and 4 nm. Other ranges of boundary 202 widths may be acceptable, and the acceptable range may differ depending on the material selected as the segregant. Stated differently, the width of the boundary 202 is selected to be as thin as possible while still preventing magnetic exchange between grains 200.

A desired boundary 202 width may be achieved by modifying the composition of the material to be deposited on the disk 102. As stated previously, the material includes a magnetic material and a non-magnetic material or segregant. In one embodiment, the concentration of segregants is in the range of between about 1 at % and 20 at %, 2 at % and 10 at %, or 5 at % and 8 at %.

Figure 3:
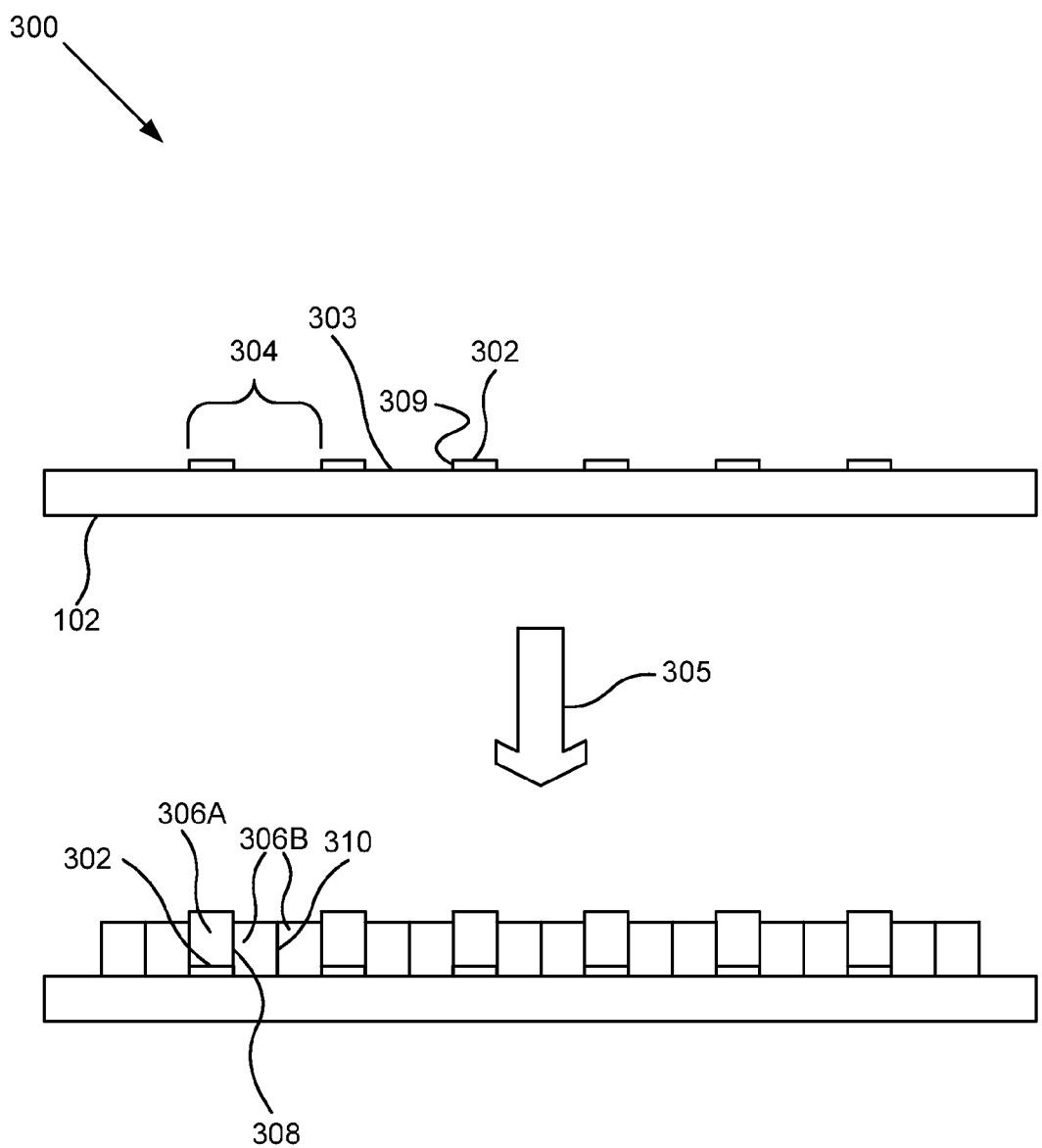
FIG. 3 is a schematic block diagram illustrating one embodiment of disk patterning.

FIG. 3 is a schematic block diagram illustrating one embodiment of disk 102 having a magnetic layer applied thereon or formed therein. The pattern can be formed in the substrate or be formed in any of various layers applied onto the substrate. Mechanical patterns formed in or on the disk 102, or substrate, guide the growth of the grains 200 of FIG. 2. Furthermore, substrate patterning promotes granular homogeneity and improved grain size distribution. Instead of random grain nucleation sites, the mechanical pattern 300 defines relatively precise boundaries or intersections between a series of features (e.g., protrusions 302) and adjacent recesses or spaces that limit the randomness of grain nucleation sites. In certain implementations, adjacent is defined to mean in contact with. For example, edges of the features are in contact with the edges of respective adjacent spaces to define the boundaries or intersections between the features and spaces. Stated differently, each protrusion 302 more precisely defines the area where a magnetic grain may grow, which in turn limits the randomness of magnetic grain growth and thus improves grain size distribution.

In one embodiment, the mechanical pattern 300 is a repeating series of features, such as the protrusions 302, and adjacent recesses or spaces 303 therebetween formed by topographical nanofabrication methods including, but not limited to patterning (lithography), etching, deposition, and micro cutting. Alternatively, and as will be describe below with reference to FIG. 4, chemical patterning may be utilized to form a chemical pattern.

The pattern 300 is formed having a pitch 304 in the range of between about 1 and 6 grain widths. In another embodiment, the pitch 304 is in the range of between about 3 and 5 grain widths. In yet another embodiment, the pitch 304 has a width of 3 grain widths. A pitch 304 of three grain widths, for example, relieves lithography resolution requirements and allows for grains that are smaller than current lithography resolution limits. In general, the average width of a magnetic grain is about 10 nm. Alternatively, or additionally, the pitch may have a width in the range of between about 10 and 40 nm, 20-30 nm, or 25-27 nm.

The protrusions 302 have a height in the range of between about 1 and 10 nm. In another embodiment, the protrusions 302 have a height in the range of between about 3-4 nm. Although the pattern 300 is depicted here in a linear manner, the pattern 300 may be formed in any manner on the surface of the disk. For example, the protrusions 302 may be formed in a hexagonally closed-pack arrangement.

Arrow 305 represents the step of depositing the magnetic material and segregant on the disk 102. For clarity, the well-known specific steps of depositing magnetic material are not described here, but examples of deposition techniques include chemical vapor deposition, physical vapor deposition (sputtering), molecular beam epitaxy, etc.

At the surface of the substrate, the topographical features of the pattern 300 interact with the mobile sputtered material to more precisely guide the growth of magnetic regions 306A, 306B compared to prior art techniques. Stated differently, the topographically patterned areas influence the migration of the CoCrPtMOx film in a way that encourages the growth of perpendicular non-magnetic MOx or segregant boundaries 308 at the edge 309 of each protrusion 302. The edge 309 of each protrusion can be defined as intersection between the edge 309 and an adjacent space 303. The precise positioning of the segregant boundaries 308 at the edges 309 of the protrusions 302 guide the growth of magnetic grains 306A on top of or above the protrusions 302 between the segregant boundaries. Additionally, the precise positioning of the segregant boundaries 308 at the edges 309 of the protrusions 302 guide the growth of magnetic grains 306B within the spaces between the protrusions 302. In certain implementations, magnetic grains 306B can form in the space adjacent a single protrusion 302, such as at an outer periphery of the pattern. The number of magnetic grains 306B formed between adjacent protrusions 302 is dependent on the pattern's pitch. Further, should the spacing between protrusions 302 support multiple grains 306B, the multiple grains 306B are separated by one or more MOx segregant boundaries 310 that form as a natural result of the growth of the grains and the spacing between the protrusions. Accordingly, due to the immiscible nature of the magnetic material and the segregant, the magnetic material gathers near the center of a protrusion 302, and the segregant gathers around the edge 309 of the protrusion 302 to form the vertical segregant boundaries 308. Furthermore, because the distance between protrusions 302 is greater than an average grain width, multiple grains will form between protrusions 302.

The pattern 300 may be thought of as having a first feature such as the protrusion 302, and a second feature, such as the recess or space 303 that is formed between the protrusions 302. In the depicted embodiment, these alternating and repeating features of protrusions 302 and spaces form the pattern 300. In this manner, the patterned substrates, whose features and pitch are selected according to a desired grain size, guides a more uniform grain growth. In other words, grains having a more uniform size and shape are possible with the patterned substrate because the pattern forms an array of nucleation sites. Further, although the top surface of the deposited magnetic layer in FIG. 3 is substantially uneven, in practice, the non-uniformity of the top surface of the sputter deposited magnetic material tends to not be so dramatically non-uniform as depicted, but actually tends to be smoother than the underlying etched patterns below.

Figure 4:
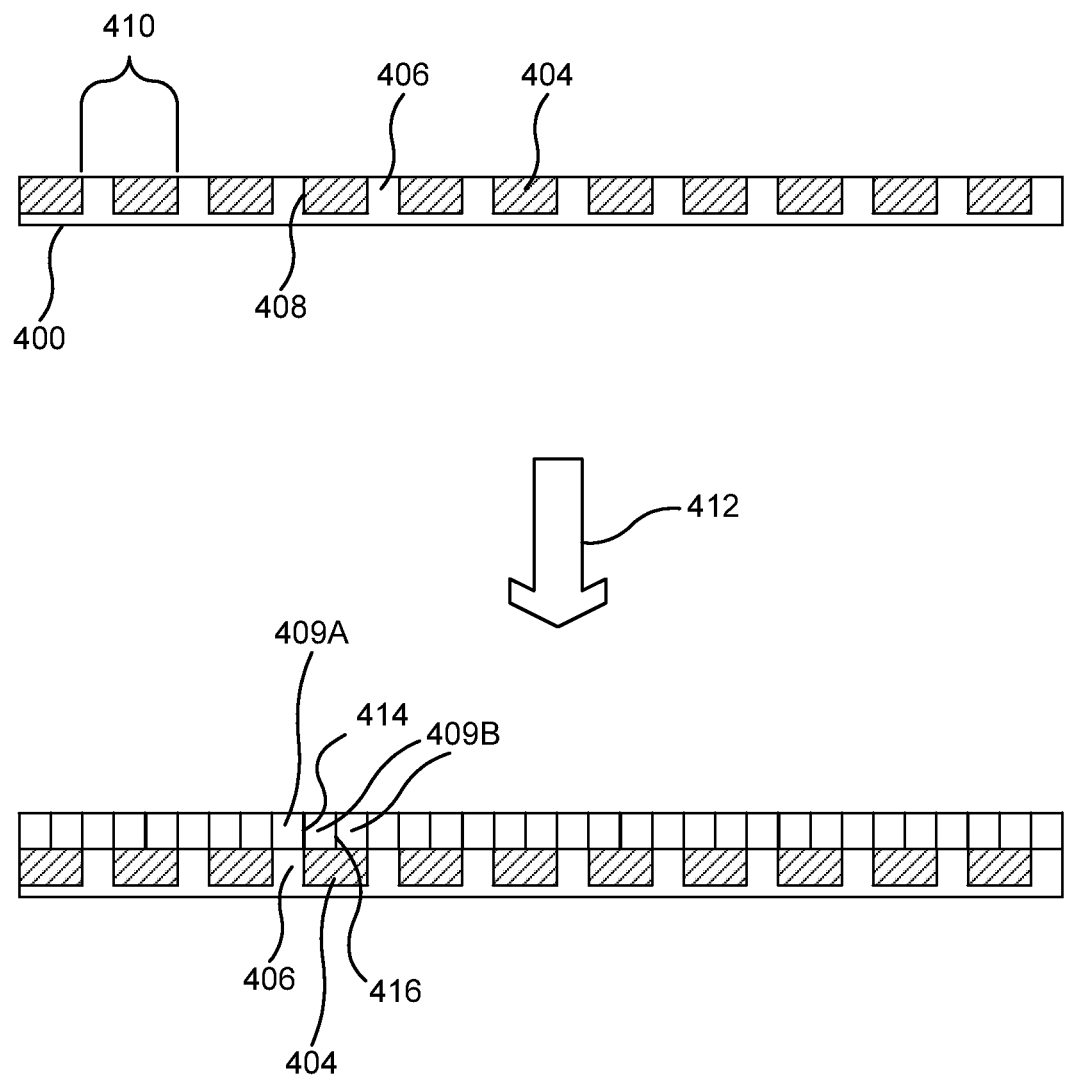
FIG. 4 is a schematic block diagram illustrating one embodiment of a chemically patterned disk.

FIG. 4 is a schematic block diagram illustrating one embodiment of a chemically patterned disk 400. As used herein, a chemically patterned disk refers to a disk having a pattern formed of a first and a second material 404, 406 (e.g., first and second material regions 404, 406). Chemical patterning, as above with mechanical patterning, promotes granular homogeneity and improved grain size distribution. Instead of random grain nucleation sites, the chemical pattern 400 defines relatively precise boundaries or intersections between adjacent or alternating first and second material regions that limit the randomness of grain nucleation sites. Stated differently, each boundary edge 408 more precisely defines the area where a magnetic grain may grow, which in turn limits the randomness of magnetic grain growth and thus improves grain size distribution of the media.

The first material 404, in one embodiment, may be a magnetic material, such as a magnetic material similar to the magnetic material deposited on the disk 102 as discussed above. The second material 406, in one embodiment is the disk 400, or alternatively, a filler material such as $SiO_2$. The pattern illustrated may be achieved, as those of skill in the art will recognize, by etching features, such as troughs, into the disk 400, depositing the first material 404 onto the disk 400, and etching back the surface to planarize the disk 400. Examples of etching back the surface include, but are not limited to, ion beam etching, or reactive ion etching. The adjoining edges or intersection 408 of adjacent regions of the first material 404 and second material 406 function in a manner similar to the edges of the protrusion features of FIG. 3. In other words, the adjoining edges 408 guide the growth of the grains 409A, 409B, including magnetic material and non-magnetic segregant. The edges 408 between the first and second materials 404, 406 cause MOx segregant boundaries 414 to form on the edges 408. The MOx segregant boundaries 414 guide the growth of magnetic grains 409A on top of or above the second material regions 406. Additionally, the positioning of the segregant boundaries 414 at the edges 408 guide the growth of magnetic grains 409B on top of or above the first material regions 404. The number of magnetic grains 409B formed above the first material regions 404 and the formation of MOx segregant boundaries 416 between the grains 409B occur in a manner similar to the magnetic grains 306B and boundaries 310 of FIG. 3.

The chemical pattern 400 is formed having a pitch 410 in the range of between about 1 and 6 grain widths. In another embodiment, the pitch 410 is in the range of between about 3 and 5 grain widths. In yet another embodiment, the pitch 410 has a width of 3 grain widths. A pitch 410 of three grain widths, for example, relieves lithography resolution requirements and allows for grains that are smaller than current lithography resolution limits. Alternatively, or additionally, the pitch 410 may have a width in the range of between about 10 and 40 nm, 20-30 nm, or 25-27 nm.

As above, arrow 412 represents the step of depositing the magnetic material and segregant on the disk 400. For clarity, the well-known specific steps of depositing are not described here, but examples of depositing include chemical vapor deposition, physical vapor deposition (sputtering), molecular beam epitaxy, etc.

Figure 5:
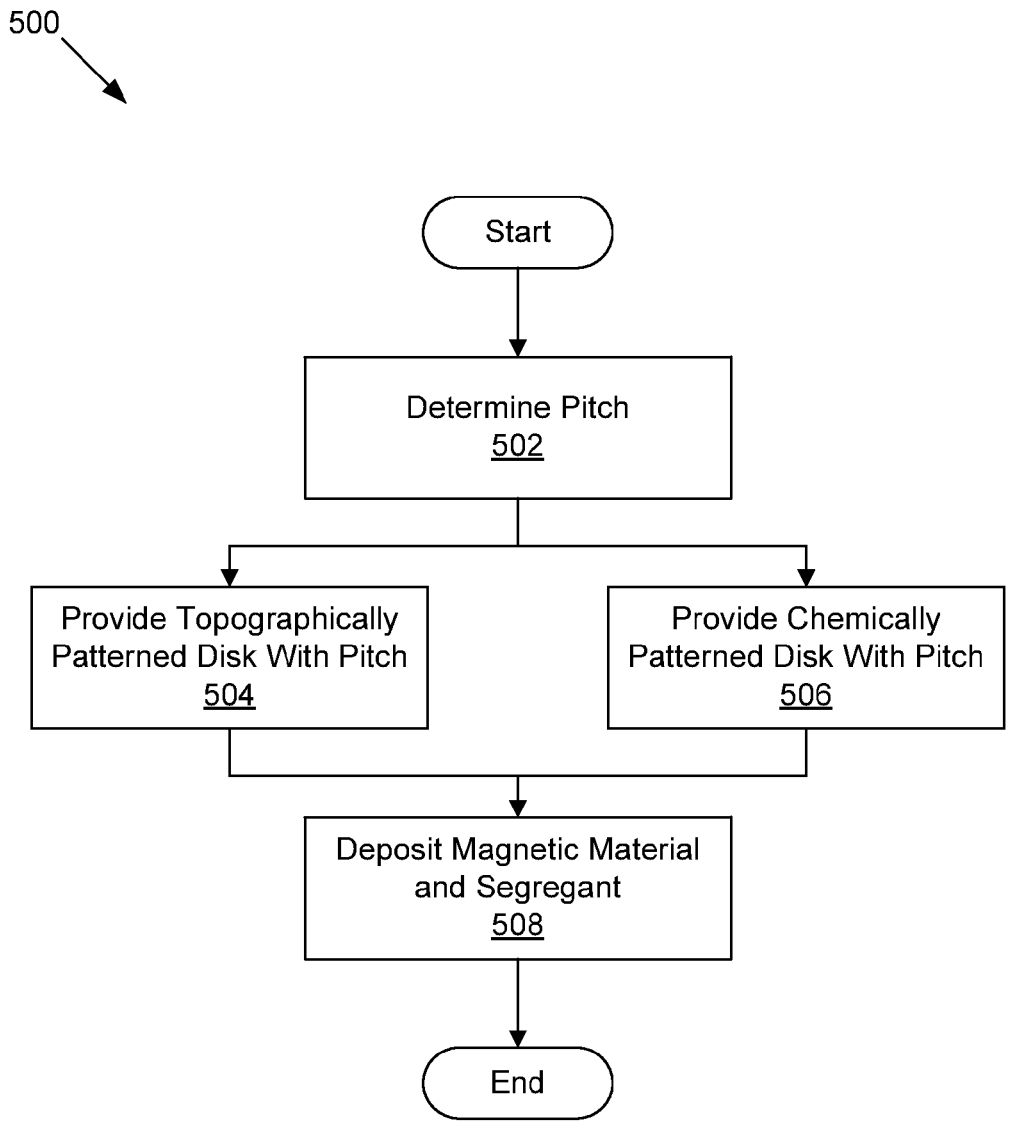
FIG. 5 is a schematic flow chart diagram illustrating one embodiment of a method for substrate patterning.

FIG. 5 is a schematic flow chart diagram illustrating one embodiment of a method 500 for patterning a substrate. In one embodiment, the method 500 starts and the pitch of the pattern is determined 502. The pattern, as described above, is formed having a pitch substantially equivalent to the width of three grains, where the width of a grain is determined by an average width or a mean width of the grains. Alternatively, the pitch is substantially equivalent to the width of between about 1 and 5 grains. In another example, the pattern has a pitch in the range of between about 10 and 40 nm, 20-30 nm, or 25-27 nm.

The method 500 continues, and a disk is provided with a pattern having the pitch formed either by topographical patterning 504 or chemical patterning 506. Topographical patterning 504, in one embodiment, includes microfabricating features on the surface of a disk. Examples of microfabricating include patterning (lithography), etching, deposition, and micro cutting.

Chemical patterning 506, as described above, includes patterning a disk with a first material and a second material. The first material may be a magnetic material. The second material may be the disk, or alternatively, a filler material. The pattern of first material and second material may be formed by depositing the first material on the disk, etching a pattern using lithography, depositing the second material, and then etching back the surface of the disk to form a planar surface. Examples of etching back the surface include, but are not limited to, ion beam etching, or reactive ion etching.

Both the topographical patterned disk and the chemically patterned disk are formed with physical boundaries. In the example of the patterned disk, the physical boundary is the edge of the raised area of FIG. 3. In the example of the chemically patterned disk, the physical boundary is the edge between the first material and the second material.

The method continues and magnetic material and segregant are deposited 508. Examples of depositing magnetic material and segregant include chemical vapor deposition, physical vapor deposition (sputtering), molecular beam epitaxy, etc. The physical boundaries of both the topographically patterned disk and the chemically patterned disk guide the grain growth of the magnetic material and the segregant. The segregant is immiscible and mobile and tends to collect near the physical boundaries, thereby forming a non-magnetic boundary around the magnetic material.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The schematic flow chart diagrams and method schematic diagrams described above are generally set forth as logical flow chart diagrams. As such, the depicted order and labeled steps are indicative of representative embodiments. Other steps and methods may be conceived that are equivalent in function, logic, or effect to one or more steps, or portions thereof, of the methods illustrated in the schematic diagrams. Additionally, the format and symbols employed are provided to explain the logical steps of the schematic diagrams and are understood not to limit the scope of the methods illustrated by the diagrams. Although various arrow types and line types may be employed in the schematic diagrams, they are understood not to limit the scope of the corresponding methods. Indeed, some arrows or other connectors may be used to indicate only the logical flow of a method. For instance, an arrow may indicate a waiting or monitoring period of unspecified duration between enumerated steps of a depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A magnetic storage medium, comprising:
    a pattern formed on a substrate, the pattern comprising a first region made from a first material and a second region made from a second material different than the first material, the first region being laterally adjacent the second region;
    a magnetic layer formed on the pattern, the magnetic layer comprising magnetic grains separated by a non-magnetic segregant boundary, wherein at least one of the magnetic grains is positioned above the first region and at least one of the magnetic grains is positioned above the second region, the non-magnetic segregant boundary being positioned above an edge defined between the first and second regions;
    wherein the segregant boundary forms a boundary between the magnetic grains.

2. The magnetic storage medium of claim 1, wherein the pattern comprises a plurality of first regions and a plurality of second regions, each first region being positioned between adjacent second regions.

3. The magnetic storage medium of claim 1, wherein the pattern has a pitch in the range of between the width of about 1 grain and the width of about 6 grains.

4. The magnetic storage medium of claim 3, wherein the pitch is in the range of between the width of about 2 grains and the width of about 4 grains.

5. The magnetic storage medium of claim 3, wherein the pitch is the width of about 3 grains.

6. A method of fabricating a magnetic storage medium, the method comprising:
    determining a pitch of a pattern to be formed on a substrate, the pattern comprising first and second features, wherein an intersection is defined between respective first and second features, the first feature being made from a first material and the second feature being made from a second material different than the first material, wherein the first feature is laterally adjacent the second feature;
    patterning the substrate according to the pattern with the determined pitch; and
    depositing a coating of magnetic grains and non-magnetic material on the substrate, the non-magnetic material accumulating above each of the intersections of the first and second features to form segregant boundaries, and the magnetic grains accumulating between the segregant boundaries, wherein at least one of the magnetic grains is positioned above the first feature and at least one of the magnetic grains is positioned above the second feature.

7. The method of claim 6, wherein the pitch is in the range of between the width of about 2 magnetic grains and the width of about 6 magnetic grains.

8. The method of claim 6, wherein the pitch is in the range of between the width of about 3 magnetic grains and the width of about 6 magnetic grains.

9. The magnetic storage medium of claim 1, wherein the first material comprises a magnetic material, and the second material comprises a non-magnetic material.

* * * * *